(12) United States Patent
Kasher et al.

(10) Patent No.: US 8,909,151 B2
(45) Date of Patent: Dec. 9, 2014

(54) SYSTEM AND METHOD TO AVOID SATURATION OF AN ASSOCIATING WIGIG STATION

(75) Inventors: Assaf Kasher, Haifa (IL); Ran Mor, Petach-Tivka (IL)

(73) Assignee: Intel Corporation, Santa Clara, CA (US)

( * ) Notice: Subject to any disclaimer, the term of this patent is extended or adjusted under 35 U.S.C. 154(b) by 218 days.

(21) Appl. No.: 13/532,625

(22) Filed: Jun. 25, 2012

(65) Prior Publication Data

US 2013/0344810 A1  Dec. 26, 2013

(51) Int. Cl.
*H04B 7/00* (2006.01)
*H04W 76/02* (2009.01)
*H04W 48/12* (2009.01)
*H04W 16/28* (2009.01)

(52) U.S. Cl.
CPC .............. *H04W 76/02* (2013.01); *H04W 48/12* (2013.01); *Y02B 60/50* (2013.01); *H04W 16/28* (2013.01)
USPC ........................ 455/41.2; 455/127.1; 455/501

(58) Field of Classification Search
CPC .................................................. H04W 52/322
USPC ...................... 455/41.2, 127.1, 501, 522, 558
See application file for complete search history.

(56) References Cited

U.S. PATENT DOCUMENTS

| | | | |
|---|---|---|---|
| 2007/0253355 A1* | 11/2007 | Hande et al. | 370/328 |
| 2010/0246459 A1* | 9/2010 | Ding et al. | 370/311 |
| 2013/0189939 A1* | 7/2013 | Wang | 455/127.1 |

\* cited by examiner

*Primary Examiner* — Tuan H Nguyen
(74) *Attorney, Agent, or Firm* — Ellis B. Ramirez; Prass LLP

(57) ABSTRACT

A system and method are provided to facilitate establishing WiGig communications links between WiGig-enabled wireless devices and WiGig PBSS Control Points and Access Points (PCP/AP). The PCP/AP transmits beacons that are intended to assist the wireless devices in locating the PCP/AP. Based on the directional nature of WiGig communications, the beacons are transmitted directionally in a number of sectors in multiple directions simultaneously or in sequence. When devices, such as wireless devices, attempting to connect via a PCP/AP, are positioned very close to the PCP/AP, the devices may be incapable of receiving the transmitted beacons because the low noise amplifier (LNA) located in the individual wireless device receiver may become saturated. The disclosed systems and methods broadcast the beacons at lower power according to different schemes at certain intervals to avoid saturating the LNAs.

22 Claims, 4 Drawing Sheets

SYSTEM AND METHOD TO AVOID SATURATION OF AN ASSOCIATING WIGIG STATION

BACKGROUND

1. Field of the Disclosed Embodiments

This disclosure relates to systems and methods for facilitating connection between a WiGig-enabled wireless device and a WiGig-enabled wireless access point.

2. Related Art

With the proliferation of wireless devices of all types running increasingly sophisticated applications, the demand for available bandwidth has increased dramatically. Communications in the millimeter wave (mmWave), e.g., 60 GHz, region of the frequency spectrum have emerged as a unique solution to the need for increased bandwidth for a number of reasons. Transmitting, for example, in the 60 GHz frequency range offers extremely high data throughputs as a result of the unlicensed ultra-wide bandwidth available. A tradeoff is that communications in this frequency range are highly directional.

Wireless communications in the 60 GHz frequency range experience a high level of atmospheric RF energy absorption. Understanding that the transmitted RF energy in this frequency region would be quickly absorbed by oxygen molecules in the atmosphere over long distances, wireless technology developers focused on this characteristic as a benefit for certain applications. Previously, the high levels of atmospheric absorption and resultant range limitations were viewed as rendering mmWave technologies unsuitable for certain wireless applications. As there emerged a need for short-range, selective, and interference free high data throughput transmission paths, however, mmWave technologies, and particularly 60 GHz mmWave systems, emerged as a solution.

An ability to provide secure, straight-line, high data rate communications is a significant plus. This is balanced by the need to establish and maintain directional beam communication with a receiving device, such as a wireless device with which a mmWave source, or access point, is communicating.

Communication standards for operations in the mmWave portion of the RF spectrum are being established and revised by the Wireless Gigabit Alliance or WiGig. WiGig is an organization promoting the adoption of multi-gigabit speed wireless communications technologies operating primarily in the unlicensed 60 GHz mmWave frequency band. The WiGig specification defines a standard for high speed wireless communication in support of wireless data, display and audio applications that supplement the capabilities of local area network (LAN) devices operating in other portions of the unlicensed RF spectrum. WiGig-enabled devices may deliver data at rates that are 7-10 times faster than the rates available for existing Wi-Fi devices. The mmWave communication capabilities will generally be referred to throughout this disclosure as WiGig communications. A very similar standard to WiGiG is the IEEE 802.11TGad: Draft Standard for Information Technology—Telecommunications and Information Exchange Between 7 Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band ("IEEE802.11TGad"). Devices described in this application as being WiGiG compatible devices may also be IEEE802.11TGad compatible devices.

Directional WiGig communications rely on establishing communication between the wireless device and a wireless access point such as, for example, a WiGig Private Basic Service Set (PBSS) Control Point/Access Point (PCP/AP). The PCP/AP transmits beacons periodically. These beacons allow wireless devices to associate with the PCP/AP for wireless WiGig communications.

SUMMARY OF THE DISCLOSED EMBODIMENTS

In order to facilitate establishing WiGig communications links between wireless devices and a WiGig PCP/AP, the PCP/AP transmits beacons that are intended to assist the wireless non-PCP/AP STA devices in locating the PCP/AP. Based on the directional nature of WiGig communications, the beacons are transmitted directionally in a number of sectors in multiple directions. When devices, such as wireless devices that are attempting to connect via a PCP/AP, are positioned very close to the PCP/AP, the devices may be incapable of receiving the transmitted beacons because the low noise amplifier (LNA) located in the individual wireless device receiver may become saturated.

Users may believe that placing the wireless device in closest proximity to the PCP/AP is most beneficial in making the connection based, for example, on the users' experiences with other wireless connections, including infrared. This close proximity, however, may exacerbate the saturation of the LNA.

The situation will likely to preclude the wireless device from connecting via the PCP/AP. In other words, a 60 GHz (WiGig or IEEE802.11TGadcompliant) wireless device attempting to associate with a WiGig PCP/AP may fail to associate if the user places it to close to the PCP/AP because the LNA in the receiver of the wireless device becomes saturated whenever the PCP/AP transmits a beacon. This difficulty may be particularly acute in instances in which the wireless device is a small form factor device, e.g., a smartphone. The user will err in such instances in trying to "improve" link quality by placing the device close to the PCP/AP antennas, saturating the receiver LNA in the small form factor device with every beacon transmission.

In view of the above shortfalls in current WiGig implementations, it may be beneficial to provide a modified beacon transmission scheme for beacons emanating from the PCP/AP in a manner that may increase the likelihood of connection with individual wireless devices that are attempting to connect via the PCP/AP.

Exemplary embodiments may provide a PCP/AP that transmits a beacon at intervals and that, for example, at every k intervals (k being an integer greater than 1), transmits a beacon at a reduced power level in order to avoid saturating a low noise amplifier in an individual wireless device that may be attempting to connect with the PCP/AP and that may be placed in close proximity to the PCP/AP.

Exemplary embodiments may provide an opportunity for an individual wireless device attempting to connect with the PCP/AP to receive a beacon transmitted at a lower power level that does not saturate an LNA in a receiver in the individual wireless device in order to facilitate connection of the individual wireless device with the PCP/AP.

Exemplary embodiments may provide a PCP/AP that transmits a beacon at a reduced power level, for example, at a 10 Db reduction from a normal beacon power level in order to facilitate connection with an individual wireless device in a manner that does not saturate an LNA in the individual wireless device.

In exemplary embodiments, an association of an individual wireless device with a particular WiGig-enabled PCP/AP may occur more slowly because a lower power level beacon is transmitted only every k intervals (k being an integer greater than 1). This is preferable, however, to a failure of the individual wireless device to connect to the PCP/AP at all.

In exemplary embodiments, the transmission of the low power level beacon will not adversely affect other connection capabilities with the transmitting PCP/AP, which at all other times transmits the beacon at a normal power level.

Exemplary embodiments may transmit a beacon at a lower power level every k intervals (k being an integer greater than 1) by transmitting the beacon omnidirectionally every k intervals.

Exemplary embodiments may facilitate connection between a wireless device and a PCP/AP when the PCP/AP is configured to transmit a beacon in a sector adjacent to a sector in which the wireless device is located with respect to the PCP/AP.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for facilitating connection between a WiGig-enabled device and a WiGig-enabled PCP/AP will be described, in detail, with reference to the following drawings, in which.

DETAILED DESCRIPTION OF THE DISCLOSED EMBODIMENTS

Figure 1:
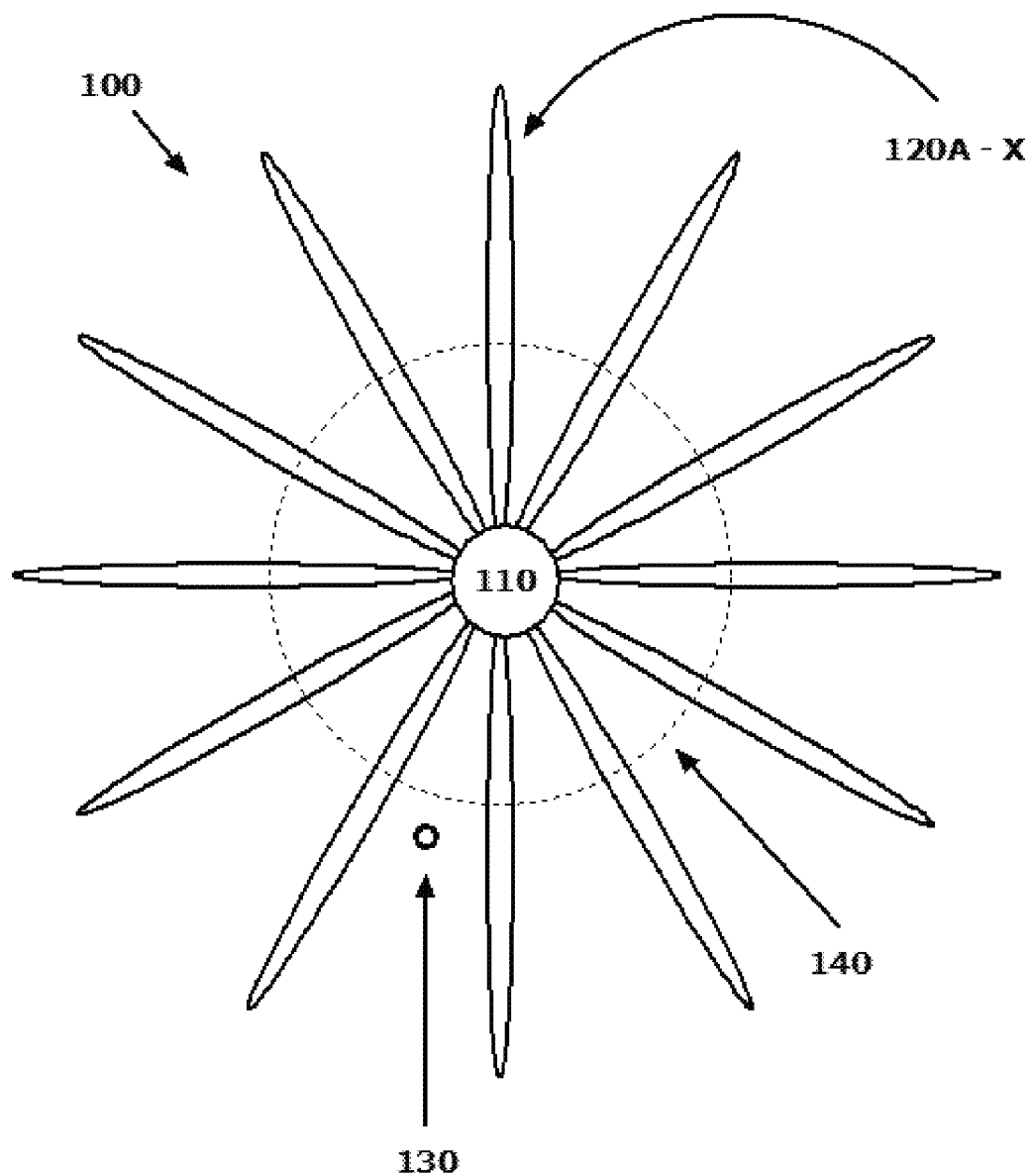
FIG. 1 illustrates an exemplary broadcast pattern for a beacon transmission emanating from a WiGig-enabled PCP/AP that may be modified by the systems and methods according to this disclosure.

The systems and methods for facilitating connection between a WiGig-enabled wireless device and a WiGig-enabled access point will generally refer to this specific utility for those systems and methods. Exemplary embodiments described and depicted in this disclosure should not be interpreted as being specifically limited to any particular combination of communicating capabilities or applications, or to any specific system infrastructure. In fact, any selective beacon-aided wireless connectivity scheme, and any complementary configuration for WiGig-enabled PCP/AP, that may benefit from the systems and methods according to this disclosure is contemplated.

Specific reference to, for example, any wireless device should be understood as being exemplary only, and not limited, in any manner, to any particular class of wireless devices, such as, for example, smartphones, netbooks, notebook computers, electronic tablets, wireless capable PDAs or the like, particularly those that include at least one WiGig radio. The systems and methods according to this disclosure will be described as being particularly adaptable to being hosted on WiGig-enabled PCP/AP for communication with myriad wireless devices, but should not be considered as being limited to only these classes of devices.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized and obtained by means of the individual elements, and combinations of those elements, as particularly pointed out in the appended claims. While specific implementations are discussed, it should be understood that this is done for illustration purposes only. A person skilled in the relevant art will recognize that other components and configurations may be used without departing from the spirit and scope of the subject matter of this disclosure.

As indicated above, in order to facilitate establishing communications via a PCP/AP, the PCP/AP transmits one or more beacon frames in different directions, generally referred to as sectors. These beacons may carry network management information for the network supported by, or accessed by, the PCP/AP. Based on the directional nature of WiGig communications, the beacon frames may include information usable to facilitate a beamforming process between the PCP/AP and one or more individual wireless devices. To join the network supported by the PCP/AP via the PCP/AP, an individual wireless device may scan for a beacon, establish some initial beamforming and once communications are established, complete an association with the PCP/AP for executing WiGig communications with the network. The beacons are transmitted using antenna arrays. The arrays are generally steerable in order that the beacon may be transmitted in individual sectors from the PCP/AP. It also may be possible to employ an omnidirectional antenna which would result in transmissions in any individual sector occurring at a lower overall power. Transmitting omnidirectionally may result in a loss of 6-15 Db from a normal power level.

FIG. 1 illustrates an exemplary broadcast pattern 100 for a beacon transmission emanating from a WiGig-enabled PCP/AP 110 that may be modified by the systems and methods according to this disclosure. As shown in FIG. 1, a WiGig-enabled PCP/AP 110 may transmit beacon signals in a number of discrete directions or sectors 120A-X in an effort to facilitate establishing wireless WiGig communications with one or more WiGig-enabled wireless devices 130. A difficulty to which the systems and methods according to this disclosure is addressed generally may occur when the wireless device 130 is placed within a certain physical proximity to the PCP/AP (the radius of a generic physical proximity being represented by the circle 140 in FIG. 1). In such instances, an LNA in the receiver unit of a WiGig radio (see FIG. 3) in the wireless device 130 may become noise saturated by the beacon signal, thereby precluding connection of the wireless device 130 with the PCP/AP 110 for wireless WiGig communications.

Figure 2A:
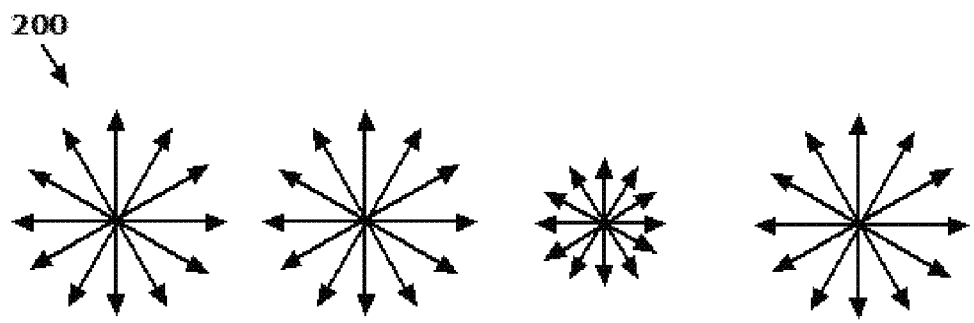
FIGS. 2A-C illustrates line drawings of exemplary modifications to beacon transmissions based on the systems and methods according to this disclosure.
Figure 2B:
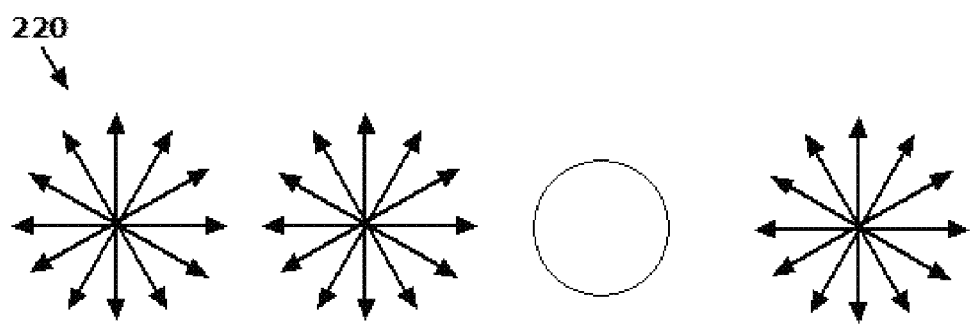
Figure 2C:
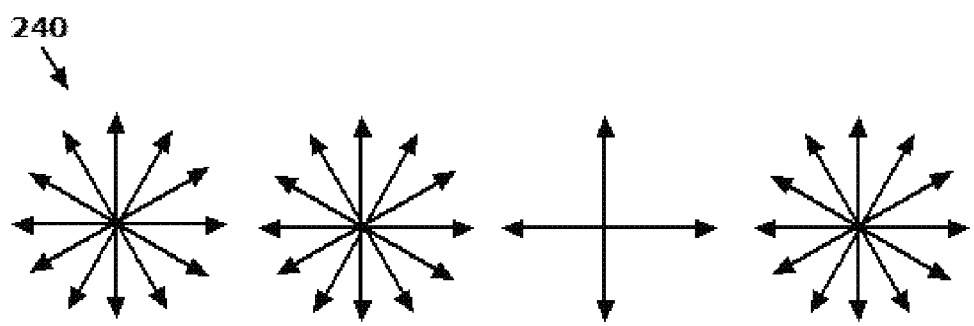

FIGS. 2A-C illustrates line drawings of exemplary modifications to beacon transmissions based on the systems and methods according to this disclosure. As shown in FIGS. 2A-C, a number of modifications may be made to the beacon transmission emanating from the PCP/AP in an effort to reduce or eliminate instances of LNA saturation in the wireless device, thereby facilitating the ability of the wireless device to establish a WiGig communication link with the PCP/AP.

In embodiment 200 shown in FIG. 2A, every k intervals (k being an integer greater than 1), the PCP/AP may transmit the beacon signal in all directions or sectors at a reduced power level in a pattern indicated by the reduced arrow lengths. For example, the beacon signal may be modulated such that an output power level is reduced 10 Db from a normal power level to reduce occurrences of LNA saturation in a receiving wireless device.

In embodiment 220 shown in FIG. 2B, every k intervals (k being an integer greater than 1), the PCP/AP may transmit the beacon signal omnidirectionally in a pattern represented by the circle. Such omnidirectional transmission may reduce an output power level at any point by 6-15 Db from a normal power level to reduce occurrences of LNA saturation in a receiving wireless device.

In embodiment 240 shown in FIG. 2C, every k intervals (k being an integer greater than 1), the PCP/AP may transmit the beacon signal in a subset of all directions or sectors at a constant or normal power level. Based on the directional nature of the beacon signal, a receiving wireless device in proximity to the PCP/AP, may still have the opportunity to receive the beacon signal, even though it is "angled off" from a direct path to the receiving wireless device, at a pseudo-reduced power level based on the spatial orientation. Each k intervals, the subset of all directions or sectors in which the beacon signal is transmitted may differ or be changed.

It should be appreciated that the above techniques may be employed individually, or they may be mixed and matched in various combinations, in order to facilitate non-saturated beacon transmission by a receiving wireless device to facilitate establishing WiGig communications between the receiving wireless device and a WiGig-enabled PCP/AP.

Figure 3:
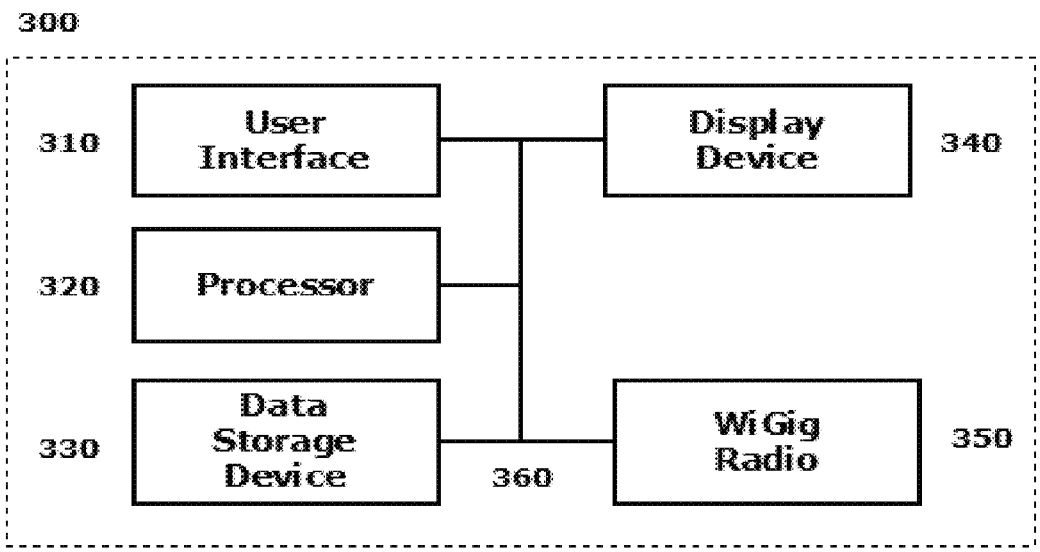
FIG. 3 illustrates a block diagram of an exemplary WiGig-enabled wireless device for use with the systems and methods according to this disclosure.

FIG. 3 illustrates a block diagram of an exemplary WiGig-enabled wireless device ("device") 300 for use with the systems and methods according to this disclosure. For the purposes of this disclosure, it is understood that the device 300 includes at least one WiGig radio 350 for establishing WiGig communications with one or more WiGig-enabled access points such as a PCP/AP.

As shown in FIG. 3, the device 300 may include a user interface 310 by which a user may communicate with the device 300, or with a network with which the device 300 is in communication. The user interface 310 in device 300 may include any device by which the user may communicate with the device 300 including, for example, an integral keyboard, a touchscreen display, and/or a microphone for interpreting voice commands or other like device for data input and exchange with the device 300. Virtually any conventional means by which a user may input data and/or instructions to the device 300 is contemplated.

The device 300 may include one or more local processors 320 for individually undertaking the processing and control functions that are carried out by the device 300 for accomplishing data communication via at least the WiGig radio 350. Processor(s) 320 may include at least one conventional processor or microprocessor that interprets and executes instructions and processes data in order to establish and enable WiGig communications in device 300.

The device 300 may include one or more data storage devices 330. Such data storage device(s) 330 may be used to store data, and operating programs or applications to be used by the device 300, and specifically the processor(s) 320. Data storage device(s) 330 may include a random access memory (RAM) or another type of dynamic storage device that stores information and instructions for execution by the processor(s) 320. Data storage device(s) 330 may also include a read-only memory (ROM), which may include a conventional ROM device or another type of static storage device that stores static information and instructions for execution by the processor(s) 320. The data storage device(s) 330 will generally be those that are integral to the device 300, and not some other data storage device that may be provided external to, and in wireless communication with, the device 300. The data storage device(s) 330 may store functions, algorithms and/or settings for reference in establishing and enabling the WiGig communications with the device 300.

The device 300 may include a display device 340 that may be configured as a conventional display device by which to inform the user regarding operation of the device 300 and/or, in combination with the user interface 310, to enable the user to execute applications stored in the device 300, or accessible by the device 300 when the device 300 is in communication with a network via at least a WiGig communication link established via the WiGig radio 350.

The device 300 may include a WiGig radio 350. The WiGig radio 350 may include an integral WiGig transceiver, or otherwise may include separate transmitter and receiver devices. Regardless of a specific configuration, the receiver component or device of the WiGig radio 350 may include a low noise amplifier (LNA). The LNA may become saturated by a beacon signal being transmitted by a WiGig-enabled wireless access point (PCP/AP) when the device 300 is positioned in too close a proximity to the PCP/AP thereby precluding an ability of the device 300 to establish WiGig communications with the PCP/AP via the WiGig radio 350. It should be noted that the device 300 may include other radios for establishing communication links in other portions of the licensed or unlicensed RF spectrum including, for example, a Wi-Fi radio or a cellular telephone radio.

All of the various components of the device 300, as depicted in FIG. 3, may be connected by one or more data/control busses 360. The data/control bus(ses) 360 may provide internal communication between the various components of the device 300, as all of those components are housed integrally in the device 300.

It is anticipated that the various disclosed elements of the device 300 may be arranged in combinations of sub-systems as individual components or combinations of components, but regardless of the specific configuration, all of the depicted components may be integral to a single unit that is the device 300.

Figure 4:
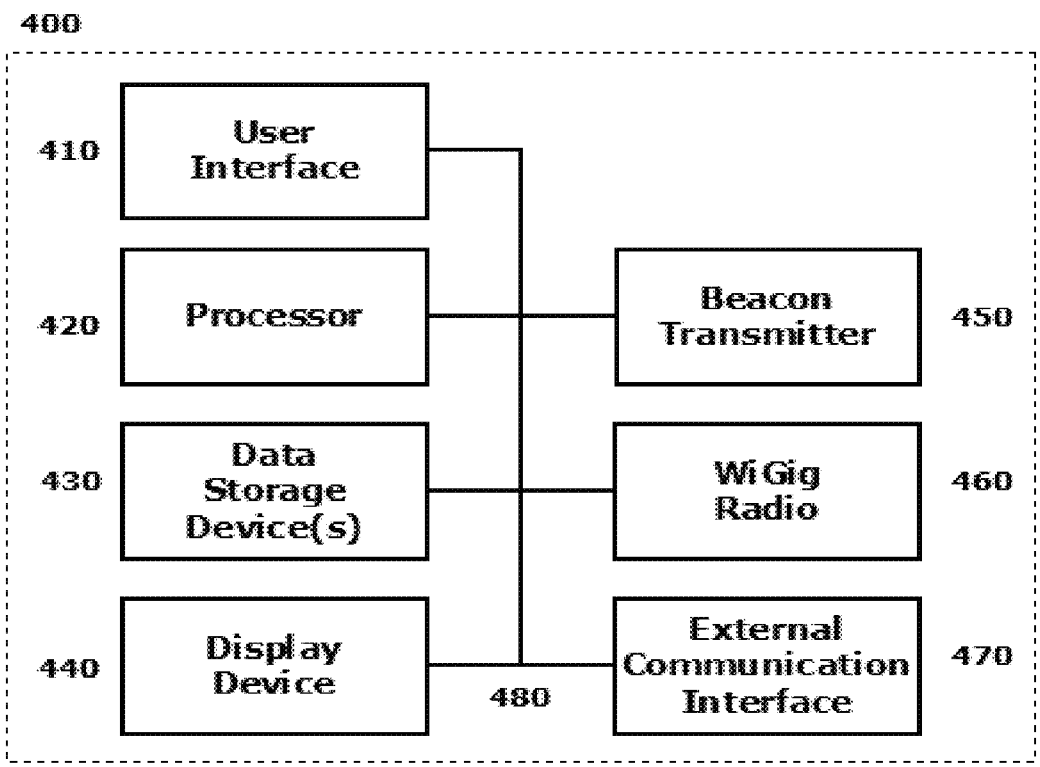
FIG. 4 illustrates a block diagram of an exemplary WiGig-enabled wireless access point for use with the systems and methods according to this disclosure.

FIG. 4 illustrates a block diagram of an exemplary WiGig-enabled wireless access point, such as a "PCP/AP," 400 for use with the systems and methods according to this disclosure.

The PCP/AP 400 may include its own user interface 410 by which a user may communicate with the other components of the PCP/AP 400. The user interface 410 in the PCP/AP 400 may include similar devices to those described above with reference to the user interface 310 in the device 300. Alternatively, the user interface 410 may comprise a separate keyboard and mouse, or other user interface device such as, for example, a portable data storage medium and compatible data storage medium reader that the user may employ to input data and/or instructions to the PCP/AP 400.

The PCP/AP 400 may include one or more processors 420 that are configured to carry into effect the determinations and control functions, including beacon signal transmission control and sequencing. It is anticipated that most of the determinations regarding beacon signal transmission sequencing that may facilitate establishing WiGig communication with one or more wireless devices will be undertaken by the processor(s) 420 in the PCP/AP 400, possibly based on information provided by a user via the user interface 410 to select one or more of the beacon signal schemes that are depicted in exemplary fashion in FIG. 2.

The PCP/AP 400 may include one or more data storage devices 430. The data storage device(s) 430 may be used for static or dynamic storage of data to be transmitted to one or more wireless devices. The data storage device(s) 430 may be segregated according to the type of data stored, or the communication link for which the data is stored when more than a WiGig radio 460 may be a part of the PCP/AP 400.

The PCP/AP 400 may include its own display device 440 that may be configured as a conventional display device by which to inform the user regarding operation of the PCP/AP 400 and/or status of the communication links or devices in communication with the PCP/AP 400 for monitoring purposes.

The PCP/AP 400 may include a separate beacon transmitter 450, or the beacon transmitter may be a portion of one of the radios, including the WiGig radio 460 housed in the PCP/AP 400. The beacon transmitter 450 may have a number of operating modes that may result in beacon signal being manipulated according to one of the exemplary schemes shown, for example, in FIGS. 2A-C under direction of the processor 420 or otherwise.

The PCP/AP 400 may include a WiGig radio 460. The WiGig radio 460 may include an integral WiGig transceiver, or otherwise may include separate transmitter and receiver devices. It should be noted that the PCP/AP 400 may include other radios for establishing communication links in other portions of the licensed or unlicensed RF spectrum including, for example, a Wi-Fi radio or a cellular telephone radio.

The PCP/AP 400 may include one or more external communication interfaces 470 by which data and application information may be exchanged with a network that the PCP/AP 400 supports for effecting WiGig communication with one or more WiGig-enabled wireless devices to facilitate the wireless device(s) exchanging data with, and executing applications hosted on, the network. The external communication interface 470 may be configured to facilitate wired or wireless communication according to any protocol that may be available for data exchange and application execution communications with the network supported by the PCP/AP 400.

All of the various components of the PCP/AP 400, as depicted in FIG. 4, may be connected by one or more data/control busses 480. The data/control bus(ses) 480 may provide wired or wireless communication between the various components of the PCP/AP 400, whether locally housed together in a single unit or remotely dispersed in multiple individual facilities.

It should be appreciated that, although depicted in FIG. 4 as an integral unit, the various disclosed elements of the PCP/AP 400 may be arranged in any combination of sub-systems as individual components or combinations of components, housed in a single location or remotely dispersed in multiple locations and in wired or wireless communication with other of the individual components of the PCP/AP 400. In other words, no specific configuration as an integral unit or as a support unit, or as several units or sub-systems widely dispersed, for the PCP/AP 400 is to be implied by the depiction in FIG. 4.

Figure 5:
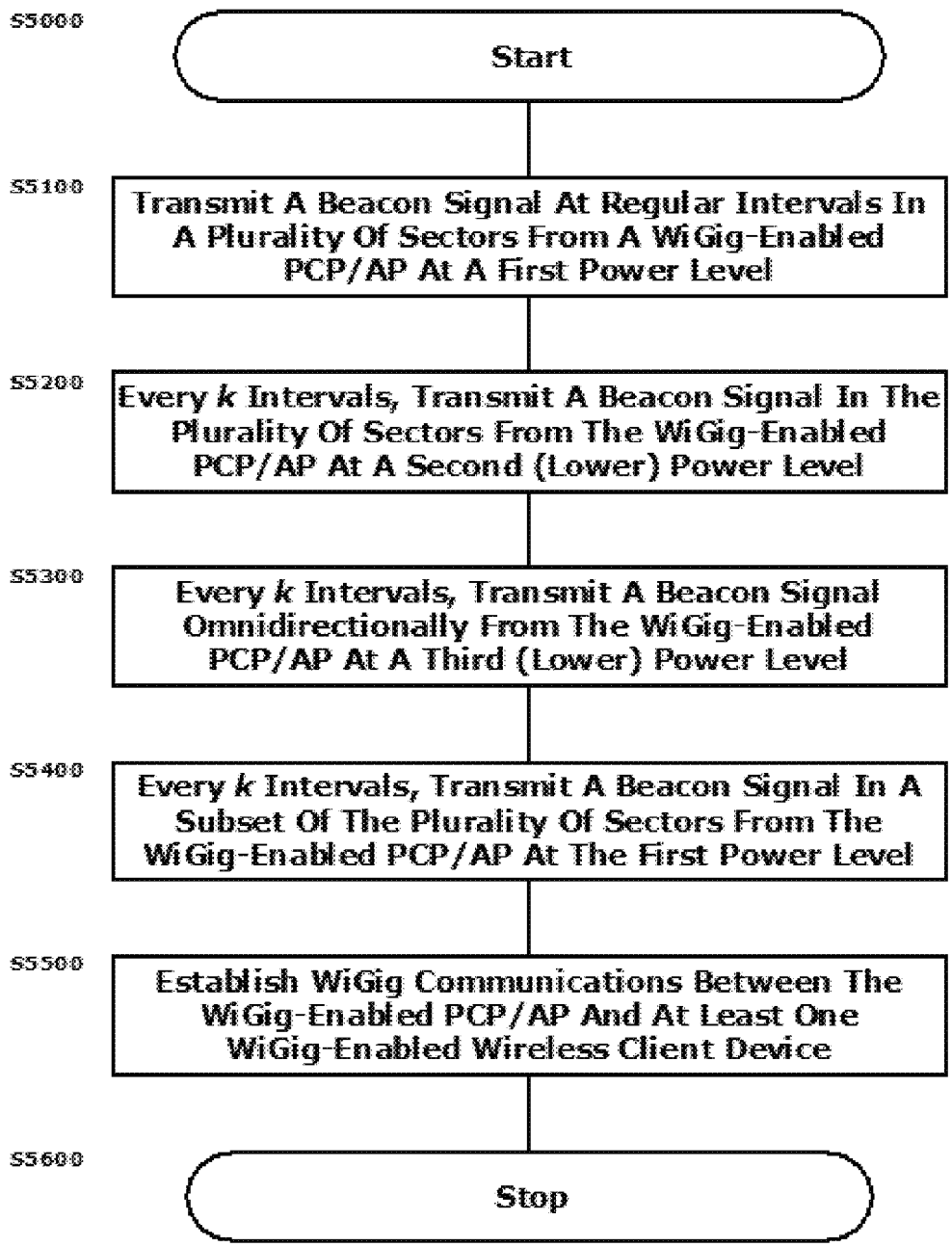
FIG. 5 illustrates a flowchart of an exemplary method for facilitating connection between a WiGig-enabled wireless device and a WiGig-enabled wireless access point according to this disclosure.

FIG. 5 illustrates a flowchart of an exemplary method for facilitating connection between a WiGig-enabled wireless device and a WiGig-enabled wireless access point (PCP/AP) according to this disclosure. As shown in FIG. 5, operation of the method commences at Step S5000 and proceeds to Step S5100.

In Step S5100, a beacon signal may be transmitted at regular intervals from a WiGig-enabled PCP/AP at a first (normal) power level in all of a plurality of sectors to facilitate connection with at least one wireless device located in at least one of the plurality of sectors. Operation of the method proceeds to Step S5200.

In Step S5200, at k intervals (where k is an integer greater than 1), the beacon signal may be transmitted from the WiGig-enabled PCP/AP at a second (lower) power level in all of the plurality of sectors to facilitate connection with at least one wireless device located in at least one of the plurality of sectors. The second (lower) power level may be, for example, reduced 10 Db from the first (normal) power level. Operation of the method proceeds to Step S5300.

In Step S5300, at k intervals (where k is an integer greater than 1), the beacon signal may be transmitted from the WiGig-enabled PCP/AP omnidirectionally at a third (lower) power level to facilitate connection with at least one wireless device. Omnidirectional transmission of the beacon signal may realize a 6-15 Db reduction from the first (normal) power level. Operation of the method proceeds to Step S5400.

In Step S5400, at k intervals (where k is an integer greater than 1), the beacon signal may be transmitted from the WiGig-enabled PCP/AP at the first (normal) power level in a subset of all of the plurality of sectors to facilitate connection with at least one wireless device located in at least one of the plurality of sectors other than the subset of the plurality of sectors. Operation of the method proceeds to Step S5500.

In Step S5500, WiGig communication may be established between the at least one wireless device and the WiGig-enabled PCP/AP facilitated by the beacon signal in at least one of the above-described modes. Operation of the method proceeds to Step S5600, where operation of the method ceases.

The disclosed embodiments may include a non-transitory computer-readable medium storing instructions which, when executed by a processor, may cause the processor to execute the steps of a method as outlined above.

The above-described exemplary systems and methods reference certain conventional components to provide a brief, general description of suitable communication and processing environments in which the subject matter of this disclosure may be implemented for familiarity and ease of understanding. Although not required, embodiments of the disclosure may be provided, at least in part, in a form of hardware circuits, firmware or software computer-executable instructions to carry out the specific functions described, such as program modules, being executed by a processor. Generally, program modules include routine programs, objects, components, data structures, and the like that perform particular tasks or implement particular data types.

Those skilled in the art will appreciate that other embodiments of the disclosed subject matter may be practiced in communication network environments with many types of communication equipment and computing system configurations.

Embodiments may also be practiced in distributed network communication environments where tasks are performed by local and remote processing devices, generally as outlined above, that are linked to each other by hardwired links, wireless links, or a combination of both through a communication network. In a distributed network environment, program modules may be located in both local and remote data storage devices.

Embodiments within the scope of the present disclosure may also include computer-readable media having stored computer-executable instructions or data structures that can be accessed, read and executed by a particular module or device in, for example, a WiGig-enabled PCP/AP. Such computer-readable media can be any available media that can be accessed by a processor in, or in communication with, the PCP/AP. By way of example, and not limitation, such computer-readable media can comprise RAM, ROM, EEPROM, CD-ROM, DVD-ROM, flash drives, thumb drives, data memory cards or other analog or digital data storage devices that can be used to carry or store desired program elements or steps in the form of accessible computer-executable instructions or data structures. When information is transferred or provided over a network or another communications connection the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause network components, or a processor in, for example, a PCP/AP, to perform certain of the above-specified functions, individually, or in combination. Computer-executable instructions also include program modules that are remotely stored for access by the PCP/AP to be executed by processors in the PCP/AP when it is caused to communicate in the disclosed network environment across any communication links such as those WiGig communications links described in exemplary manner above.

The exemplary depicted sequence of executable instructions, or associated data structures for executing those instructions, represents one example of a corresponding sequence of acts for implementing the functions described in the steps. The steps of the method, as depicted, are not intended to imply that all of the depicted and described steps must be executed as part of the method or that the steps need to be executed in any particular order, except as may be necessarily inferred when one of the depicted steps is a necessary precedential condition to accomplishing another of the depicted steps. The depicted steps may be executed in series or in parallel, as applicable.

Although the above description may contain specific details, they should not be construed as limiting the claims in any way. Other configurations of the described embodiments of the disclosed systems and methods are part of the scope of this disclosure. For example, the principles of the disclosure may be applied to each individual WiGig communication link between an individual wireless device and a PCP/AP where each individual wireless device may individually and independently operate within the depicted and described system. This enables each user to use the benefits of the disclosure even if any one of the large number of possible applications do not need a specific aspect of the functionality described and depicted in this disclosure. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A method for facilitating wireless communication, comprising:
broadcasting a beacon signal from a wireless connection point at a first power level in a plurality of sectors at predetermined time intervals to facilitate connection of at least one other wireless device with the wireless connection point; and
controlling, with a processor, a broadcast scheme for the beacon signal from the wireless connection point such that the beacon signal is broadcast at a second power level in at least some of the plurality of sectors each k intervals, where k is an integer greater than one, the second power level being less than the first power level;
wherein the second power level is set to a level that avoids saturating a low noise amplifier in the at least one other wireless device when in close proximity to the wireless connection point.

2. The method of claim 1, the controlling, with the processor, comprising controlling the power level of the beacon signal to broadcast the beacon signal from the wireless connection point at the second power level in all of the plurality of sectors at each k intervals.

3. The method of claim 2, the second power level being at least a 10 Db power reduction from the first power level.

4. The method of claim 1, the controlling, with the processor, comprising controlling the beacon signal to broadcast the beacon signal omnidirectionally from the wireless connection point at each k intervals.

5. The method of claim 4, the omnidirectional broadcast of the beacon signal realizing at least a 6 Db reduction in an output power level from the wireless connection point.

6. The method of claim 1, the controlling, with the processor, comprising controlling the beacon signal to broadcast the beacon signal from the wireless connection point at the first power level in a subset of the plurality of sectors at each k intervals.

7. The method of claim 6, the subset of the plurality of sectors being a different subset in each pair of k intervals.

8. The method of claim 1, the beacon signal facilitating connection of a WiGig-enabled wireless device and a WiGig-enabled wireless connection point.

9. The method of claim 8, the WiGig-enabled wireless device and the WiGig-enabled wireless connection point communicating in the mmWave region of the radio-frequency spectrum.

10. The method of claim 9, the beacon signal carrying network management information for a network supported by the wireless access point.

11. The method of claim 10, the beacon signal including information usable to facilitate a beamforming process between the wireless access point.

12. A device to facilitate WiGig communications, comprising:
a beacon transmitter that broadcasts a beacon signal at a first power level in a plurality of sectors at predetermined time intervals to facilitate connecting for data communication with at least one wireless device; and
a processor that is programmed to control a broadcast scheme for the beacon signal such that the beacon signal is broadcast at a second power level in at least some of the plurality of sectors each k intervals, where k is an integer greater than one, the second power level being less than the first power level;
wherein the second power level is set to a level that avoids saturating a low noise amplifier in the at least one wireless device when in close proximity to a wireless connection point.

13. The device of claim 12, further comprising a WiGig radio transmitting in the mmWave region of the radio frequency spectrum for establishing data communication with a compatible wireless device.

14. The device of claim 12, the processor controlling the power level of the beacon signal to broadcast the beacon signal at the second power level in all of the plurality of sectors at each k intervals.

15. The device of claim 14, the second power level being at least a 10 Db power reduction from the first power level.

16. The device of claim 12, the processor controlling the beacon signal to broadcast the beacon signal omnidirectionally at each k intervals.

17. The device of claim 16, the omnidirectional broadcast of the beacon signal realizing at least a 6 Db reduction in an output power level from the device.

18. The device of claim 12, the processor controlling the beacon signal to broadcast the beacon signal at the first power level in a subset of the plurality of sectors at each k intervals.

19. The device of claim 18, the subset of the plurality of sectors being a different subset in each pair of k intervals.

20. The device of claim 12, the beacon signal carrying network management information for a network.

21. The device of claim 20, the beacon signal including information usable to facilitate a beamforming process.

22. A non-transitory computer-readable medium storing computer-readable instructions which, when executed by a processor, causes the processor to execute a method to facilitate WiGig communications between a wireless device and a wireless connection point, the method comprising:
  broadcasting a beacon signal from the wireless connection point at a first power level in a plurality of sectors at predetermined time intervals to facilitate connection of at least one wireless device with the wireless connection point; and
  controlling a broadcast scheme for the beacon signal from the wireless connection point such that the beacon signal is broadcast at a second power level in at least some of the plurality of sectors each k intervals, where k is an integer greater than one, the second power level being less than the first power level;
  wherein the second power level is set to a level that avoids saturating a low noise amplifier in the at least one wireless device when in close proximity to the wireless connection point.

* * * * *